US011880361B2

United States Patent
Zimmermann et al.

(10) Patent No.: US 11,880,361 B2
(45) Date of Patent: Jan. 23, 2024

(54) COMMUNICATION DEVICES AND METHODS

(71) Applicant: ORANGE, Issy-les-Moulineaux (FR)

(72) Inventors: Julien Zimmermann, Chatillon (FR); Emmanuel Bertin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 550 days.

(21) Appl. No.: 16/623,993

(22) PCT Filed: Jun. 11, 2018

(86) PCT No.: PCT/FR2018/051356
§ 371 (c)(1),
(2) Date: Dec. 18, 2019

(87) PCT Pub. No.: WO2018/234654
PCT Pub. Date: Dec. 27, 2018

(65) Prior Publication Data
US 2020/0201852 A1     Jun. 25, 2020

(30) Foreign Application Priority Data
Jun. 20, 2017    (FR) ...................................... 1755625

(51) Int. Cl.
*G06F 16/2452*    (2019.01)
*G06F 16/242*    (2019.01)
(Continued)

(52) U.S. Cl.
CPC ........ *G06F 16/2452* (2019.01); *G06F 16/243* (2019.01); *G06F 40/42* (2020.01);
(Continued)

(58) Field of Classification Search
None
See application file for complete search history.

(56) References Cited

U.S. PATENT DOCUMENTS 10,268,756 B2 *   4/2019   Burlik ................ G01C 21/3667
2009/0024705 A1   1/2009   Rama Rao
(Continued)

FOREIGN PATENT DOCUMENTS

FR        3050843 A1     11/2017
WO    WO-2005073908 A1 *  8/2005    ............. G06F 17/27
WO        2017021579 A1    2/2017

OTHER PUBLICATIONS

English translation of the Written Opinion of the International Searching Authority dated Sep. 24, 2018 for corresponding International Application No. PCT/FR2018/051356, filed Jun. 11, 2018.
(Continued)

*Primary Examiner* — Tuankhanh D Phan
(74) *Attorney, Agent, or Firm* — David D. Brush; Westman, Champlin & Koehler, P.A.

(57) ABSTRACT

A communication device associated with a transmitting entity and including: a first transmitting/receiving module capable of receiving, from the transmitting entity, a query formulated in a predetermined computer language or in a predetermined natural language; a translation module, activated if the query is formulated in the predetermined computer language, and configured to translate the query into the predetermined natural language; an extraction module configured to extract from the query formulated in the predetermined natural language at least one keyword representing the query; an identification module configured to identify, using the at least one keyword extracted, a target device supporting the predetermined natural language towards which to transmit the query; and a second transmitting/receiving module configured to transmit the query formulated in the natural language to the target device.

14 Claims, 5 Drawing Sheets

(51) Int. Cl.
  *G06F 40/42*   (2020.01)
  *G06F 40/58*   (2020.01)
  *G16Y 40/35*   (2020.01)
  *H04L 51/04*   (2022.01)

(52) U.S. Cl.
  CPC .............. *G06F 40/58* (2020.01); *G16Y 40/35* (2020.01); *H04L 51/04* (2013.01)

(56) References Cited

U.S. PATENT DOCUMENTS

| | | |
|---|---|---|
| 2016/0255186 A1 | 9/2016 | Kaneblai Martins Costa et al. |
| 2017/0150225 A1* | 5/2017 | Trollope .......... H04N 21/44226 |
| 2018/0096058 A1* | 4/2018 | Anderson ............... G06F 16/35 |
| 2018/0191711 A1* | 7/2018 | Bhaya .................... G06F 21/32 |

OTHER PUBLICATIONS

International Search Report dated Sep. 13, 2018 for corresponding International Application No. PCT/FR2018/051356, filed Jun. 11, 2018.

Written Opinion of the International Searching Authority dated Sep. 13, 2018 for corresponding International Application No. PCT/FR2018/051356, filed Jun. 11, 2018.

* cited by examiner

| | KEYW | DEV/OBJ | PARAM | |
|---|---|---|---|---|
| E1 → | "Température" | DCOM2(O2) | Celsius/Farenheit | ← DB1 |
| E2 → | .... | .... | .... | |
| E3 → | .... | .... | .... | |

COMMUNICATION DEVICES AND METHODS

CROSS-REFERENCE TO RELATED APPLICATIONS

This Application is a Section 371 National Stage Application of International Application No. PCT/FR2018/051356, filed Jun. 11, 2018, which is incorporated by reference in its entirety and published as WO 2018/234654 A1 on Dec. 27, 2018, not in English.

BACKGROUND OF THE INVENTION

The invention relates to the general field of communication systems.

It relates more particularly to the communication between connected objects or communicating objects, such as those considered notably in the context of the Internet of Objects (or IoT for Internet of Things).

Such objects are hardware and/or software devices, connected to a communication network such as, for example, the public Internet network or to a wireless network, and which can thereby communicate with other systems or other objects that are connected to obtain and/or supply information or data. No limitation is attached here to the nature of these communicating objects: they can be telephones, peripheral devices such as a printer or a screen, various sensors (e.g. temperature, pressure, acoustic signal, etc.), a purely software application (in other words a computer program), etc., nor is any limitation attached to the manner in which these communicating objects are connected to their network (e.g. wired link, radio, etc.).

Currently, when a connected object O1 (or, more generally, a computer program implemented by this object) wants to communicate with another connected object O2 (or, more generally, with a computer program implemented by that object O2), for example to ask it to execute a request, the connected object O1 has to use the computing methods (functions, procedures, protocols, etc.) supported by the connected object O2. Here, computer language supported by the object denotes the set of these computing methods, hereinbelow referenced M2 for the object O2.

The computer language M2 generally comprises one or more determined commands, each command being able to be associated with one or more parameters making it possible to specify the command. For example, when the object O2 is a temperature sensor, such a command aiming to trigger the acquisition of the temperature by the object O2 can be "get_temperature(unit)", in which "unit" is a parameter of the "get_temperature" command that makes it possible to specify the command, and that can here take two distinct values, namely "CELSIUS" or "FAHRENHEIT".

To interact with the connected object O2, the connected object O1 can be programmed in advance by its designer with the computing methods defined by the computer language M2, and be configured to use these computing methods in its interaction with the object O2. According to another alternative, the connected object O1 can be able to discover, from a capabilities server or directly from the connected object O2, the capabilities of the connected object O2, and in particular the computer language M2 used thereby, and to be programmed on the fly to be able to use this computer language M2 to communicate with the connected object O1.

According to one or other of these alternatives, the connected object O1 needs to have an a priori knowledge of the computer language M2 or be able to be updated to support (i.e. be compatible with) this computer language M2. This can prove restrictive or require significant developments, even pose feasibility problems. Some computer languages can in fact be coded only statically in the objects which use them.

OBJECT AND SUMMARY OF THE INVENTION

The invention makes it possible to remedy notably the abovementioned problems by proposing associating, with each of the connected objects communicating according to a computer language which is specific to them, a communication device configured to translate into natural language the methods of this computer language and more particularly the requests and the responses likely to be transmitted by the connected object according to its function according to this computer language. Natural language (also designated ordinary language) is understood to mean a "normal" language, spoken by a human being, such as French or English for example, unlike a formal language such as a computer language or a machine language (e.g. binary).

More specifically, the invention targets a communication device associated with a so-called transmitting entity comprising:
 a first transmission/reception module capable of receiving, from the transmitting entity, a request formulated in a predetermined computer language or in a predetermined natural language;
 a translation module, activated if the request is formulated in the predetermined computer language, and configured to translate the request into the predetermined natural language;
 an extraction module configured to extract, from the request formulated in the predetermined natural language, at least one keyword representative of the request;
 an identification module configured to identify, by using said at least one extracted keyword, a target device supporting the predetermined natural language to which to transmit the request; and
 a second transmission/reception module configured to transmit the request formulated in the natural language to the target device.

Correlatively, the invention relates also to a communication method intended to be implemented by a communication device associated with a so-called transmitting entity, this method comprising:
 a step of reception of a request transmitted by the transmitting entity and formulated in a predetermined computer language or in a predetermined natural language;
 if the request is formulated in the predetermined computer language, a step of translation of the request into the predetermined natural language;
 a step of extraction, from the request formulated in the predetermined natural language, of at least one keyword representative of the request;
 a step of identification, by using said at least one extracted keyword, of a so-called target device supporting the predetermined natural language to which to transmit the request formulated in the natural language; and
 a step of transmission of the request formulated in the natural language to the identified target device.

The invention also proposes a communication device associated with a communicating object comprising:
 a first transmission/reception module capable of receiving, from a so-called origin device, a request that the communicating object is capable of processing, said request being formulated in a predetermined natural language;

a translation module configured to translate the request received into a predetermined computer language used to communicate by the communicating object; and a second transmission/reception module, configured to transmit the request formulated in the predetermined computer language to the communicating object.

Correlatively, the invention targets a communication method intended to be implemented by a communication device associated with a communicating object:

a step of reception, from a so-called origin device, of a request that the communicating object is capable of processing, said received request being formulated in a predetermined natural language;

a step of translation of the request formulated in the predetermined natural language into a predetermined computer language used by the communicating object to communicate; and a step of transmission of the request formulated in the predetermined computer language to the communicating object.

The communication devices associated with the transmitting or receiving entities can be incorporated directly in these entities, or, as a variant, be located on application servers with which the entities can communicate.

The so-called transmitting entity refers here to the entity which transmits a request and the receiving entity refers to an entity which is capable of processing this request, that is to say of executing it and/or of responding thereto depending on the nature of the request.

Thus, in a particular embodiment, the communication device associated with the transmitting entity is such that:

the first transmission/reception module is activated on reception of a response formulated in the natural language to the request, to transmit this response to the transmitting entity; and the translation module is also configured to translate the response prior to its transmission to the transmitting entity into the predetermined computer language if the transmitting entity communicates by using the predetermined computer language.

Correlatively, the communication method implemented by the communication device associated with the transmitting entity can also comprise:

a step of reception of a response to the request, said response being formulated in the natural language; and a step of transmission of the response to the transmitting entity, said response being previously translated into the predetermined computer language if the transmitting entity communicates by using the predetermined computer language.

Similarly, in a particular embodiment, the communication device associated with the receiving entity is such that:

the translation module is also configured to translate, into the predetermined natural language, a response to the request received from the communicating object and formulated in the predetermined computer language; and the first transmission/reception module is also configured to transmit the response formulated in the predetermined natural language to the origin device.

Correlatively, the communication method implemented by the receiving entity can also comprise:

a step of reception, from the communicating object, of a response to the request, said response being formulated in the predetermined computer language;

a step of translation of the response formulated in the predetermined computer language into the predetermined natural language; and a step of transmission to the origin device of the response formulated in the predetermined natural language.

It should be noted that the invention applies to transmitting entities (transmitting a request to be executed) and receiving entities (capable of processing the request and of executing it) of connected or communicating object type, but one or other of these entities can also be a human being communicating by using a natural language, in which case this natural language can be used directly by the communication device associated with the entity concerned without requiring prior translation.

By virtue of the invention, the transmitting and receiving entities do not need to have a prior knowledge of their respective capabilities to communicate. It is not necessary to ensure that they are compatible with one another prior to or during this communication, in particular with respect to the computer language that they use, provided that the communication devices with which they are associated share one and the same natural language, for example English, or that an intermediate device ensures the translation between the natural languages used by the respective communication devices of the transmitting and receiving entities. The communication device associated with the transmitting entity can thus directly invoke, in natural language, the function which is of interest to the transmitting entity on the receiving entity to process its request, and do this via an interaction set up in natural language (directly or indirectly via an intermediate device) between the communication device associated with the transmitting entity and the communication device associated with the receiving entity.

This greatly simplifies the communications between the transmitting and receiving entities, and makes it possible to use different types of communication channels between these entities such as, for example, a communication channel of instant messaging or chat type.

Thus, in a particular embodiment, the second transmission/reception module of the communication device associated with the transmitting entity is configured to set up, with the target device, a communication channel of instant messaging type to communicate with this target device by using the predetermined natural language.

Furthermore, the invention is noteworthy in that, once the request formulated in natural language is available, the communication device associated with the transmitting entity is advantageously configured to extract, from this request formulated in natural language, one or more keywords representative of the request, for example of the requested processing or of the type of response expected to the request. Then, from the keywords extracted in natural language, the communication device is configured to identify a target device to which to transfer the request from the transmitting entity in order for it to be processed. This target device, whether it acts as a communication device associated with a receiving entity capable of processing the request or as an intermediate device, knows the natural language used by the communication device associated with the transmitting entity and is able to utilize the request formulated in natural language (e.g. translate it into another natural language or process it directly).

Thus, according to the invention, it is not necessary, prior to the transmission of a request, for the transmitting entity to have clearly identified the receiving entity which is able to process its request, to typically ensure that it supports or is compatible with its computer language. This identification is done on the fly, based on keywords extracted from the request to take account of the fact that the latter is formulated in a natural language.

In a particular embodiment, the identification module is configured to interrogate, by using said at least one extracted keyword, a database comprising at least one keyword belonging to the predetermined natural language, linked to at least one communication device supporting the predetermined natural language and associated with a communicating object capable of processing the request of which said at least one keyword is representative.

In other words, in this embodiment, the communication device associated with the receiving entity has a knowledge of a certain number of communicating objects capable of processing requests and of the type of requests that these communicating objects are capable of processing (via the keywords), the communicating objects referenced in the database being advantageously associated with communication devices which communicate according to the same natural language as the communication device associated with the transmitting entity.

From this database, the identification module can be configured typically to identify as target device:
  a communication device associated with a communicating object capable of processing the request and linked in the database to said at least one extracted keyword; or
  a predefined device if the database does not contain said at least one extracted keyword.

This predefined device is for example a device capable of identifying a communicating object capable of processing the request of which said at least one extracted keyword is representative.

In other words, the communication device associated with the transmitting entity, when it does not have a priori knowledge of a communicating object capable of processing the request on the basis of the keywords qualifying the request that it has available, still has the possibility in this embodiment of applying to a third-party device having a more comprehensive knowledge of the communicating objects likely to process the request from the transmitting entity.

It will be noted that this more comprehensive knowledge can be linked notably to the fact that, out of the communicating objects known to the third-party device, some may be associated with communication devices communicating according to a natural language different from that used by the communication device associated with the transmitting entity. In such a case, the third-party device preferentially comprises a translation module making it possible to translate, if necessary, the natural language used by the communication device associated with the transmitting entity to this or these different natural languages to establish the link between the two communication devices.

This more comprehensive knowledge can also stem from the fact that the third-party device benefits from a more "specialized" database than the communication device associated with the transmitting entity, that is to say one that is oriented to the type of function or processing expected for the request.

In a particular embodiment, the identification module is also configured to:
  obtain capabilities of at least one communicating object; and
  add to the database a communication device supporting the predetermined natural language and associated with the communicating object by linking it to at least one keyword determined on the basis of the capabilities obtained from the communicating object.

This embodiment allows the communication device associated with the transmitting entity to enrich its database with new communicating objects.

The discovery of new communicating objects and the obtaining of the capabilities of these new communicating objects can be done by directly interrogating these new objects, for example via a protocol for discovering communicating objects and their capabilities, such as the BlueTooth™ protocol, etc.

They can also result from information communicated by a third-party device as described previously, or from learning, implemented by the communication device associated with the transmitting entity, from communicating objects which have previously processed requests from the transmitting entity.

In a particular embodiment, in the database, at least one keyword representative of a request is also linked to a parameter that makes it possible to specify said request.

For example, in the case of a request relating to the acquisition of a temperature, this parameter can consist in specifying whether it is a temperature in degrees Celsius or Fahrenheit. This can make it possible to more easily and more rapidly target a communicating object capable of processing the request from the transmitting entity.

In a particular embodiment, the communication device associated with the transmitting entity also comprises a management module configured to maintain a context for the request over a determined period, the context maintained by the management module comprising a context identifier associated with the request.

The determined period is taken to be equal, for example, to the period necessary for the request to be processed by the receiving entity (if necessary until the response to the request is received by the transmitting entity). This context maintained for the request is managed by the communication device transparently for the transmitting entity and the receiving entity. As seen from these entities, the "transaction" implemented between these two entities is stateless.

Advantageously, the maintaining of such a context offers the possibility to the communication devices associated with the two transmitting and receiving entities of dialoguing with one another without directly involving the entities, that is to say without invoking them.

Thus, for example, the communication device associated with the transmitting entity can be configured to supply, without invoking the transmitting entity, at least one parameter to the target device specifying the request in a message comprising the context identifier associated with the request.

In other words, the communication devices associated with the two entities can communicate with one another in the context of the request to specify certain parameters or certain terms of the request, etc.

In a particular embodiment, the different steps of the communication methods implemented by the communication devices associated with the transmitting and receiving entities are determined by instructions of computer programs.

Consequently, the invention also targets a computer program on an information medium, this program being able to be implemented in a communication device associated with the transmitting or receiving entity depending on the program concerned, or more generally in a computer, this program comprising instructions suitable for implementing the steps of a communication method as described above.

This program can use any programming language, and be in the form of source code, object code, or intermediate code between source code and object code, such as in a partially-compiled form, or in any other desirable form.

The invention also targets an information or storage medium that can be read by a computer, and comprising instructions of a computer program as mentioned above.

The information or storage medium can be any entity or device capable of storing the program. For example, the medium can comprise a storage means, such as a ROM, for example a CD ROM or a microelectronic circuit ROM, or even a magnetic storage means, for example a diskette (floppy disk) or a hard disk.

Also, the information or storage medium can be a transmissible medium such as an electrical or optical signal, which can be routed via an electrical or optical cable, by radio or by other means. The program according to the invention can in particular be downloaded over a network of Internet type.

Alternatively, the information or storage medium can be an integrated circuit in which the program is incorporated, the circuit being adapted to execute or to be used in the execution of the method concerned.

According to another aspect, the invention also targets a system comprising:
  a first communication device according to the invention associated with a transmitting entity originating a request;
  a second communication device associated with a receiving entity capable of processing the request;
  said first communication device being capable of transmitting, to the second communication device, said request formulated in a predetermined natural language supported by the second communication device.

According to yet another aspect, the invention targets a system comprising:
  a first communication device according to the invention associated with a transmitting entity originating a request;
  a second communication device associated with a receiving entity capable of processing said request; and
  an intermediate device between the first communication device and the second communication device to which the first communication device transmits the request formulated in a predetermined natural language, said intermediate device being configured to, on reception of the request:
    identify the second communication device associated with the receiving entity capable of processing the request; and
    transmit the request to the second communication device.

In a particular embodiment, the first and second communication devices of this system support different natural languages, and the intermediate device comprises a translation module for translating from the natural language supported by the first communication device to the natural language supported by the second communication device and vice versa, configured to translate the request before its transmission to the second communication device.

Furthermore, in a particular embodiment of the abovementioned systems, the receiving entity is a communicating object using, to communicate, a predetermined computer language and the second communication device conforms to the invention.

Moreover, in these systems, the first communication device can be included in the transmitting entity and/or said second communication device can be included in the receiving entity.

The abovementioned systems benefit from the same advantages mentioned previously as the communication device associated with the transmitting entity and the communication device associated with the receiving entity.

It is also possible to envisage, in other embodiments, the communication methods, the communication devices associated respectively with the transmitting entity and with the receiving entity and the systems according to the invention having, in combination, all or part of the abovementioned features.

BRIEF DESCRIPTION OF THE DRAWINGS

Other features and advantages of the present invention will emerge from the description given hereinbelow, with reference to the attached drawings which illustrate a completely nonlimiting exemplary embodiment thereof. In the figures.

DETAILED DESCRIPTION OF THE INVENTION

There now follows a description of a particular embodiment of the invention.

As mentioned previously, the invention allows two so-called transmitting and receiving entities to communicate with one another, without requiring prior programming of one and/or the other of these entities and even though the latter might not use the same computer language to communicate.

In the examples envisaged to illustrate the invention, the transmitting entity is a connected or communicating object O1, and more specifically an object that makes it possible to regulate the temperature of a room, whereas the receiving entity is a connected or communicating object O2 and more specifically a temperature sensor, capable of supplying the temperature of the room concerned. These examples are given purely illustratively, and the invention applies to many other contexts. No limitation is attached typically to the nature of the connected objects considered; likewise, the transmitting entity or the receiving entity can be a human being seeking to communicate with a connected object.

Furthermore, in the embodiment described here, the communication devices associated respectively according to the invention with the transmitting and receiving entities are incorporated in these transmitting and receiving entities, that is to say in the connected objects O1 and O2. In a variant embodiment, one or other of these communication devices can be hosted in an application server that can be accessed by the entity with which it (they) is (are) associated.

Figure 1:
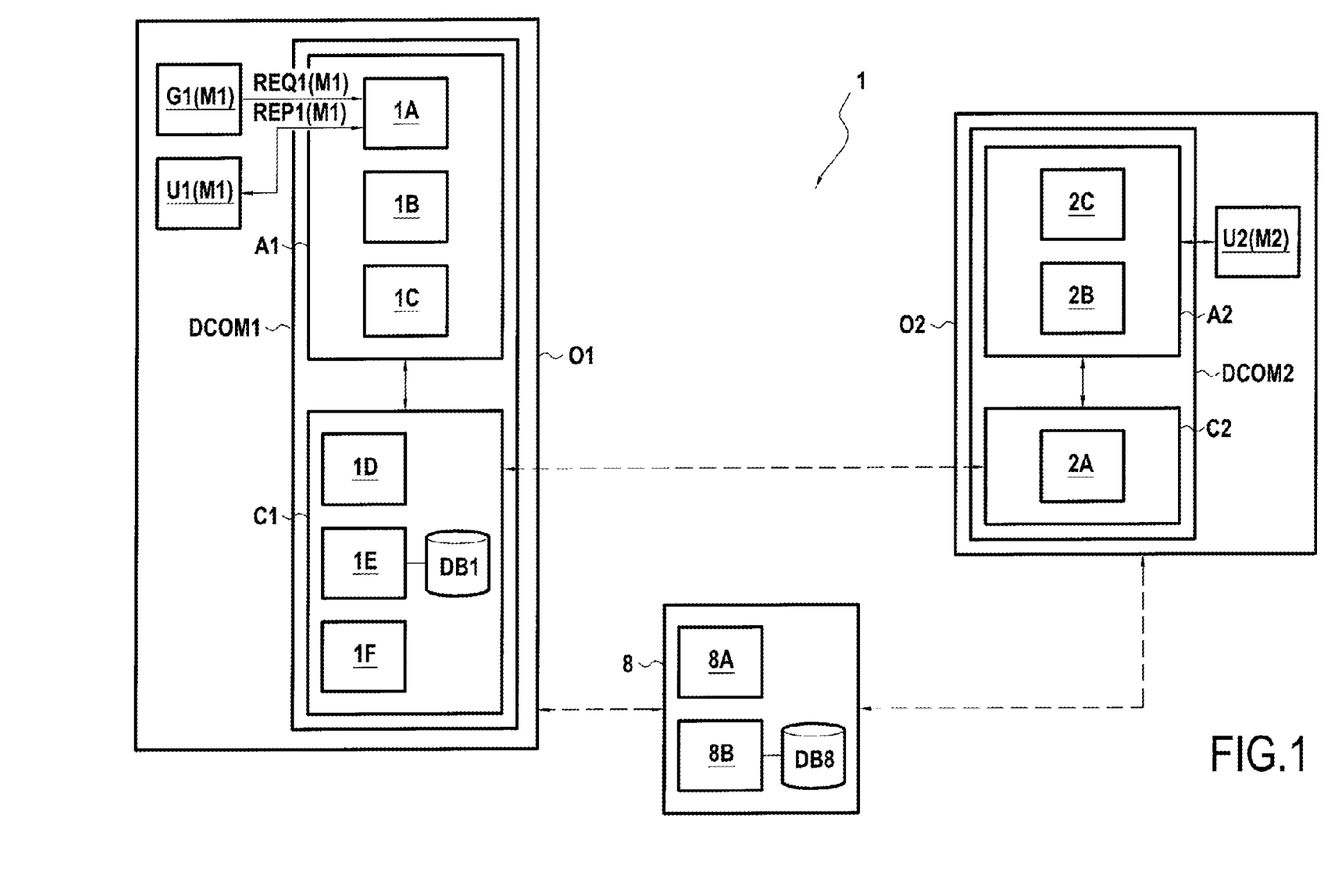
FIG. 1 schematically represents a system according to the invention, in a particular embodiment.

FIG. 1 represents, in its environment, a system 1 according to the invention in a particular embodiment.

In this embodiment, the system 1 comprises:

the object O1, which incorporates a communication device DCOM1 according to the invention and associated within the meaning of the invention with the transmitting entity O1; and the object O2, which incorporates a communication device DCOM2 according to the invention and associated within the meaning of the invention with the receiving entity O2.

The object O1 also here comprises a request generation module G1, capable of generating requests, formulated here in a predetermined computer language M1, to obtain data and/or information from other entities (and in particular from other connected objects like the connected object O2) allowing the object O1 to fulfill the functions which are assigned to it. In the example of the temperature regulator in a room, the module G1 is capable, for example, of generating a request denoted REQ1 for the purpose of obtaining the temperature of the room concerned. This request formulated in the computer language M1 used by the object O1 is, for example:

REQ1(M1)="retrieve_celsius_temp"

"Request" is understood here to mean a request formulated by the object O1 in the general sense of the term and which awaits processing. It can be a request for information or for data, the processing of which results in the provision of a response, a command resulting in the application of a processing, etc. There is no limitation attached to the nature of the requests to which the invention applies.

The object O1 also here has a module U1 for utilizing the data and/or information that it has obtained as appropriate, notably via requests that it has formulated by means of its generation module G1.

Figure 2:
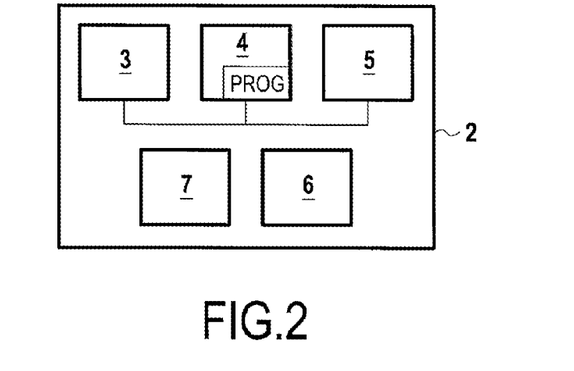
FIG. 2 illustrates the hardware architecture of a connected object belonging to the system of FIG. 1 and comprising a communication device according to the invention.

In the embodiment described here, the object O1 has the hardware architecture of a computer generally referenced 2 here, and as illustrated in FIG. 2.

The computer 2 notably comprises a processor 3, a read-only memory 4, a random-access memory 5, a non-volatile memory 6 and means 7 for communication over one or more communication networks linking together the different connected objects considered here, namely the connected objects O1 and O2. There is no limitation attached to the nature of these networks, they can be, for example, wireless, wired, mobile or fixed, or other such networks.

The read-only memory 4 of the computer 2 constitutes a storage or information medium according to the invention, that can be read by the processor 3 and on which is stored a computer program according to the invention, generally referenced in FIG. 2 by PROG. This computer program PROG differs according to the entity in whose read-only memory it is stored.

Thus, when the computer 2 is the object O1, the computer program is a program PROG1 comprising instructions for executing a communication method according to the invention implemented by the communication device DCOM1 of the connected object O1. This program PROG1 defines, through its instructions, functional modules of the communication device DCOM1 and of the object O1 which rely on and/or control the hardware elements 3-7 of the computer 2 described previously. These modules notably here comprise, as illustrated in FIG. 1:

a first module A1 which, strictly speaking, deals with the formulation of the requests from the object O1 intended for the other connected objects (and, if appropriate, of the responses received to these requests that can be accessed and interpreted by the object O1); and a second module C1 which deals with setting up a communication with a connected object likely to process the requests transmitted by the connected object O1. In the example considered here of a temperature regulator, the connected object concerned is typically a temperature sensor O2 that can measure the temperature of the room and that allows the connected object O1 to fully fulfill its function.

The modules A1 and C1 are themselves composed of several modules according to the invention defined by instructions of the program PROG1. Thus, the module A1 comprises, in the embodiment described here:

a transmission/reception module 1A, capable of receiving from the request generation module G1 of the object O1, a request REQ1. In the example considered here, the request REQ1 is formulated in the computer language M1. The transmission/reception module 1A is also capable of transmitting to the module U1 responses received, as appropriate, to the requests from the object O1 (for example a response REP1 received to the request REQ1) to the operating module U1 of the object O1; and a translation module 1B, configured to translate the request REQ1 formulated in computer language M1 into a predetermined natural language denoted NAT1. As mentioned previously, natural language (or ordinary language) is understood to mean a "normal" language, spoken by a human being, such as French or English for example, unlike a formal language such as a computer language or a machine language (e.g. binary). In the example considered here, the natural language NAT1 is French. The translation module 1B is also programmed to translate, if necessary, a response REP1 received to the request REQ1 and formulated in the natural language NAT1 into computer language M1.

In the embodiment described here, the module A1 also comprises a request management module 1C, configured (i.e. adapted, programmed) to maintain, for each request formulated by the object O1, a context denoted CNTX over a determined period chosen to be equal to the request processing time. This time extends typically from the generation of the request by the module G1 or its transmission to the module A1 to the transmission of the response to the request, as appropriate, to the module U1. The context CNTX comprises a context identifier ID associated with the request to which it is attached.

The module C1 which manages the communication with the other connected objects comprises, in the embodiment described here:

an extraction module 1D configured to extract, from the request formulated in the natural language NAT1, at least one keyword in the natural language NAT1 representative of the request. Representative of the request is understood here to mean that the extracted keyword or keywords qualifies (qualify) the request, they give a more or less precise indication of the processing which is requested thereby and of the response which is expected to make it possible to identify the connected object likely to process this request. For example, for a request concerning the measurement of a temperature, an extracted keyword can be "temperature";

an identification module 1E, configured to identify, by using the keyword or keywords extracted by the extraction module 1D, a target device TARG to which to transmit the request; and a transmission/reception module 1F configured to transmit the request formulated in the natural language NAT1 to the target device identified by the identification module 1E.

In the embodiment described here, the identification module 1E is programmed, to identify the target device TARG, to interrogate a database DB1 on the basis of the keyword or keywords extracted by the extraction module 1D. The database DB1 comprises one or more entries En, n=1, ... N, N denoting an integer greater than or equal to 1, each entry En itself comprising one or more keywords denoted K(n) belonging to the natural language NAT1, linked, in the database, to a communication device referenced by DCOMx (x designating an integer) supporting the natural language NAT1 and associated with a communicating object designated by Ox capable of processing the request of which the keyword or keywords of the entry En is (are) representative.

Figure 3:
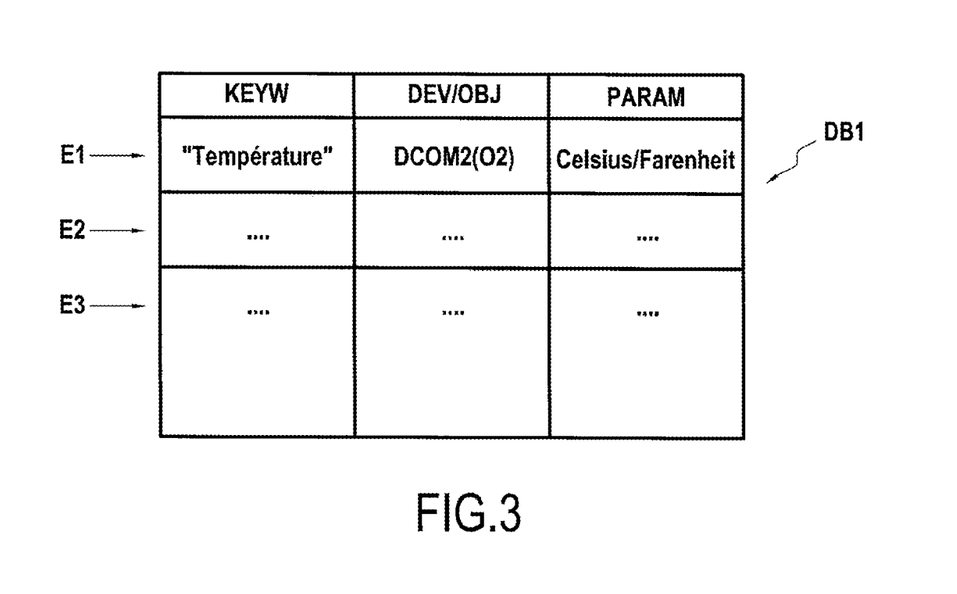
FIG. 3 gives an example of a database that can be used according to the invention.

FIG. 3 illustrates an example of entries of such a database. It will be noted that one and the same keyword or set of keywords can be associated with several different communication devices. In the illustrative example of FIG. 3, the first entry E1 of the database DB1 links a keyword "temperature" (KEYW column) to the communication device DCOM2 of the connected object O2 (DEV/OBJ column). The communication device DCOM2 is identified in the base by means of a contactability address, making it possible to contact it and set up a communication with it. This address is, for example, an IP address, a URL (Uniform Resource Locator), or any other address making it possible to contact the communication device DCOM2 and set up a communication channel with it according to the network concerned to connect the objects to one another.

Furthermore, in the example considered in FIG. 3, an entry En of the database DB1 can be associated with one or more parameters (PARAM column) specifying the request of which the keyword associated with this entry is representative. This or these parameters depends (depend) on the connected object Ox which will process the request. For example, if the object O2 is capable of delivering a measurement of the temperature in degrees Celsius or Fahrenheit, it can be useful to specify the unit in which the measurement is desired. The manner in which this parameter is used by the communication module DCOM1 is described in more detail later.

It will be noted that the database DB1 can be pre-established statically, for example by a user of the connected object O1 according to the connected objects that he or she has available, and stored in the communication device DCOM1.

As a variant, this database can be established and enriched dynamically by the communication device DCOM1, for example by its identification module 1E, by dynamically obtaining the capabilities of at least one connected object with which the communication device DCOM1 can enter into communication, and by adding, in the database DB1 for this connected object, a communication device associated with this object supporting the natural language NAT1 in relation to at least one keyword determined on the basis of the capabilities obtained from the object. The discovery of new connected objects and the obtaining of the capabilities of these new connected objects can be done by directly interrogating these new objects, for example via a protocol for discovering communicating objects and their capabilities, such as the BlueTooth™ protocol, etc. They can also result from information communicated by a third-party device, by the user of the object O1 or even through learning implemented by the communication device DCOM1 on the basis of the knowledge of the connected objects which have had the occasion to previously process requests from the object O1.

As mentioned previously, in the embodiment described here, the identification module 1E is programmed to use the database DB1 when it identifies the target device TARG to which to transfer the request translated into natural language NAT1. More specifically here, the identification module 1E is configured to choose (i.e. identify) as target device TARG:

either a communication device associated with a communicating object capable of processing the request and linked in the database DB1 to the keyword(s) extracted by the extraction module 1D;

or a predefined device if the database DB1 does not contain the keyword or keywords extracted by the extraction module 1D.

The predefined device is a third-party device 8 (cf. FIG. 1), capable of identifying, via a module 8A programmed for this purpose, a communicating object capable of processing the request, when the communication device DCOM1 and more particularly its identification module 1E is not able to do so on the basis of the information stored in the database DB1. It can be, for example, a device comprising a database DB8 that is more comprehensive than the database DB1.

The database DB8 is, for example, a base whose entries have the same form as those of the database DB1, but specialized by specialist field. Thus, in the example considered here, the database DB8 can be a base dedicated to the connected objects of the home. This database DB8 can therefore advantageously depend on the context of application of the invention.

The database DB8 can also include communication devices communicating in natural languages different from the language NAT1 used by the communication module DCOM1. In this case, each entry of the base can also be associated with a natural language used by the communication device identified by this entry. To manage these different languages, the third-party device 8 comprises a translation module 8B capable of operating in different natural languages (e.g. French, English, German, Chinese, etc.), as detailed more later.

In the example considered here, it is assumed that the connected object O2 incorporating the communication module DCOM2 is capable of responding to the request REQ1 from the connected object O1. The connected object O2 here also has the hardware architecture of a computer such as the computer 2 represented in FIG. 2 and described previously. The computer program PROG stored in the read-only memory 4 of the connected object O2 is then a program PROG2 comprising instructions for executing a communication method according to the invention implemented by the communication device DCOM2 of the connected object O2. This program PROG2 defines, through its instructions, functional modules of the communication device DCOM2 and of the object O2 which rely on and/or control the hardware elements 3-7 of the computer 2 described previously. These modules notably here comprise, as illustrated in FIG. 1:

a first module A2 which deals with formulating the requests in natural language arriving at the communication device DCOM2 and intended for the connected object O2 in a language that can be understood by the connected object O2, namely, here, in a computer language denoted M2 that the connected object O2 uses. The first module A2 deals also with formulating the responses of the connected object O2 produced in the computer language M2, in a predetermined natural language NAT2; and a second module C2 which deals with aspects linked to the communication with the other connected objects, and in particular here, with the connected object O1, and more specifically its communication device DCOM1.

The modules A2 and C2 are themselves composed of one or more modules according to the invention, defined by instructions of the program PROG2.

Thus, the module C2 comprises, in the embodiment described here, a transmission/reception module 2A capable of receiving, from a so-called origin device (for example from the third-party device 8 or from the communication device DCOM1 of the connected object O1), a request that the connected object O2 is capable of processing, this request being formulated in a predetermined natural language NAT2. The use of a natural language NAT2 identical to the natural language NAT1 or, on the contrary, distinct from the natural language NAT2, is described in more detail later. The transmission/reception module 2A is also responsible for transmitting, if appropriate, the responses from the connected object O2 to the requests which have been sent to it to the devices originating these requests. The responses are transmitted by the transmission/reception module 2A formulated in the natural language NAT2.

The module A2 comprises, for its part here:
a translation module 2B configured to translate the request received by the module C2 into the computer language M2 used to communicate by the connected object O2; and
a transmission/reception module 2C, configured to transmit the request formulated in the computer language M2 to a processing unit U2 of the connected object O2. The processing unit U2 comprises, in the example considered previously of a temperature sensor O2, a temperature measurement unit. It is that which strictly speaking executes the request and supplies a response to this request, formulated in the computer language M2, that the transmission/reception module 2C transmits to the translation module 2B to be translated into the natural language NAT2.

It will be noted that, in the embodiment described here, the objects O1 and O2 comprise communication modules DCOM1 and DCOM2 that are functionally different. However, it is possible to consider that each of the connected objects is associated with a more comprehensive communication module performing the combined functions of the two communication modules DCOM1 and DCOM2. This can prove advantageous, on the one hand, in the interests of harmonization of the communication devices associated with the different connected objects, and, on the other hand, when the connected objects considered are likely sometimes to originate requests and sometimes to be invoked to process requests.

To illustrate the mode of operation of the communication devices DCOM1 and DCOM2 incorporated respectively in the connected objects O1 and O2, and show how much these communication devices facilitate the communication between the connected objects O1 and O2, two scenarios will be considered depending on whether the communication devices DCOM1 and DCOM use the same natural language (NAT1=NAT2) or distinct natural languages (NAT1≠NAT2). The second scenario relies on the intervention of the third-party device 8 to perform the translation of the natural language NAT1 used by the communication device DCOM1 of the connected object O1 into the natural language NAT2 used by the communication device DCOM2 of the connected object O2.

Figure 4:
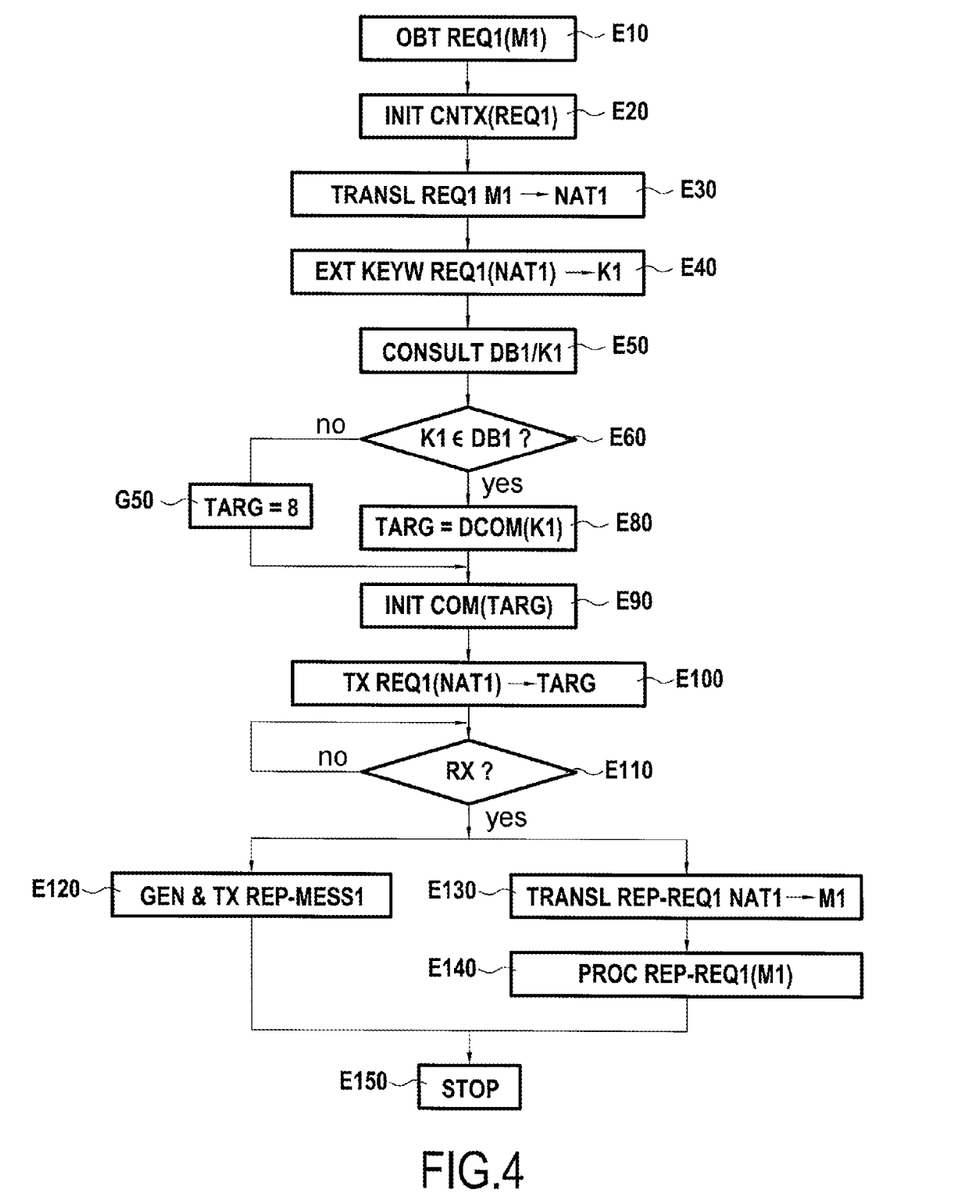
FIGS. 4 and 5 represent the main steps of communication methods according to the invention as implemented by the communication devices of the system of FIG. 1.
Figure 5:
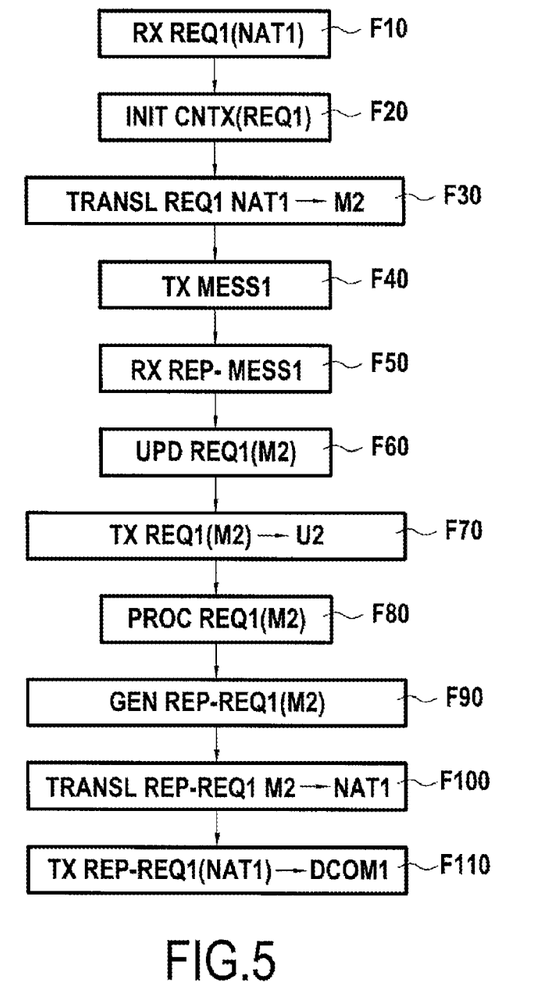

FIGS. 4 and 5 represent the different steps of the communication methods according to the invention implemented respectively by the communication devices DCOM1 and DCOM2 in the first scenario in which these communication devices use the same natural language.

Referring to FIG. 4, in this first scenario, it is assumed that the object O1, via its request generation module G1, has generated a request REQ1 for the purpose of obtaining the temperature of the room concerned, and formulated in the computer language M1 used by the object O1 according to the example given previously, namely:

REQ1(M1)="retrieve_celsius_temp"

This request REQ1(M1) is supplied by the module G1 to the transmission/reception module 1A of the module A1 of the communication device DCOM1 of the object O1 (step E10).

The reception of the request REQ1(M1) by the module A1 triggers the setting up and the maintaining, by the management module 1C, of a context CNTX(REQ1) for the request REQ1 for a determined time, taken here to be equal to the predefined processing time for the request REQ1 (step E20). The context CNTX(REQ1) set up comprises a context identifier ID(REQ1) allocated to the request REQ1.

Moreover, the request received by the transmission/reception module 1A being formulated in the computer language M1, it is translated by the translation module 1B into the natural language NAT1 (step E30). To this end, the translation module 1B uses, for example, a pre-established look-up table between, on the one hand, the methods or expressions of the computer language M1 and, on the other hand, the equivalent formulated in the natural language NAT1. Such a table is typically the reverse of that which is conventionally used in the state of the art for the voice assistants which handle the translation of expressions or of terms formulated in a natural language to a machine language or a computer language. Establishing such a look-up table does not pose any problem to the person skilled in the art and is not described further here.

The translated request REQ1 formulated in the natural language NAT1 is denoted REQ1(NAT1). In the example considered hereinabove, this request translated into French (natural language NAT1) can be, by way of illustration, "quelle est la température?" (what is the temperature?).

It will be noted that the translation of the request REQ1 into the natural language NAT1 does not necessarily repeat all the information initially present in the request formulated in computer language. Thus, in the illustrative example provided hereinabove, the fact that the temperature is given in degrees Celsius is not indicated in the request translated into natural language. This information is however stored by the management module 1C in the context CNTX(REQ1) for subsequent use if necessary.

The request REQ1(NAT1) translated into natural language NAT1 is then supplied to the module C1 of the communication device DCOM1.

On reception of this request, the extraction module 1D of the module C1 extracts, from the request REQ1(NAT1), one or more keywords K1 in natural language NAT1 representative of the request, in other words, keywords which make it possible to qualify the processing expected or required thereby (step E40). In the example considered here, the extraction module 1D extracts the keyword K1="température". The extraction module 1D can, to this end, use a pre-established base of keywords that it searches in the request REQ1(NAT1). This base can be general, or linked to a specialist field, or even depend on the type of connected object with which the communication device concerned is associated. In the example considered here, it can thus be a general base combining keywords related to home automation, or a base specializing in the regulation of parameters involved in a domestic context, or even a base more suited to the object O1 combining keywords related to the management/measurement of a temperature.

The identification module 1E of the communication device DCOM1 then uses the keyword or keywords K1 extracted by the extraction module 1D to interrogate the database DB1 in order to identify a target device TARG to which to transfer the request REQ1(NAT1) for it to be able to be processed (step E50).

Two alternatives are then possible.

If the keyword or keywords K1 is (are) not included in the base DB1 (response no to the test step E60), the identification module 1E is configured to identify as target device TARG the third-party device 8 (step E70).

If the keyword or keywords K1 is (are) included in the base DB1 and linked in this base to a communication device associated with a connected object (response yes to the test step E60), the identification module 1E identifies as target device TARG the communication device linked to the keyword(s) K1 (step E80). In the example of the database DB1, the keyword "temperature" is linked to the communication device DCOM2 of the connected object O2. The connected object O2 is in fact capable of measuring a temperature, as requested by the request REQ1 from the connected object O1. In other words, according to this illustrative example, the identification module 1E identifies, in the step E80 as target device TARG, the communication device DCOM2 of the connected object O2.

From the contactability address of the communication device DCOM2 supplied by the database DB1, the transmission/reception module 1F of the module C1 of the communication device DCOM1 sets up a communication channel over a communication network with the communication device DCOM2, and more particularly with its module C2 (step E90). The setting up of such a communication channel over a network from the communication means 7 of the connected objects is known per se and depends on the communication network concerned. This procedure is not described in detail here.

It is assumed here that the communication channel set up is a channel of instant messaging type, also more commonly known as "chat". However, this example is given purely illustratively and other types of channels can be set up (e.g. channel allowing the exchange of short messages or SMS (Short Message Service), voice over IP, etc.).

The communication channel that is thus set up is used by the transmission/reception module 1F of the communication device DCOM1 of the connected object O1 to transmit the request REQ1(NAT1) in natural language NAT1 formulated by the connected object O1 to the communication device DCOM2 and more particularly to its module C2 (step E100). The context identifier ID(REQ1) is inserted by the communication device DCOM1 into the request in natural language REQ1(NAT1) before its transmission to the communication device DCOM2.

Referring to FIG. 5, the request REQ1(NAT1) in natural language NAT1 is received by the transmission/reception module 2A of the module C2 of the communication device DCOM2 associated with the connected object O2 (step F10).

A context CNTX(REQ1) is initiated and maintained for the request REQ1 by the communication device DCOM2, with which it associates the context identifier ID(REQ1) contained in the request REQ1(NAT1) (step F20).

The request REQ1(NAT1) is then translated by the translation module 2B of the module A2 of the communication device DCOM2 into the computer language M2 used by the connected object O2 (step F30). To this end, the translation module 2B uses a pre-established look-up table between the methods of the computer language M2 and expressions and terms of the natural language NAT2 which is identical here to the natural language NAT1 (a table that is the reverse of that described previously for the translation module 1B).

In the example of request REQ1 considered previously, the request REQ1(M2) translated into the language M2 is for example:

REQ1(M2)="get_temperature ( )"

In the example considered here, it is assumed that the request REQ1(M2) translated into the language M2 requests the provision of a parameter specifying whether the measured temperature should be supplied in degrees Celsius or Fahrenheit. Since the value of this parameter is not contained in the request REQ1(NAT1) received from the communication device DCOM1, the communication device DCOM2, via its module A2, has the possibility of interrogating the communication device DCOM1 and, more specifically, its module A1, to obtain this value.

To this end, the module A2 uses the context initiated for the request REQ1 and sends a message MESS1 to the module A1 asking it to specify the value of the parameter and containing the context identifier ID(REQ1) (step F40). This message is formulated in natural language. For example, it contains the following terms: MESS1="in what unit?". It will be noted that, to formulate the message MESS1, the module A2 can rely on the look-up table that is the reverse of that used to translate the natural language NAT2 (=NAT1 here) into the computer language M2, or rely on alternative tables establishing a mapping between the parameters of the methods of the computer language M2 and of the messages that make it possible to specify these requests formulated in the natural language NAT2 (=NAT1 here).

The message MESS1 is transmitted by the transmission/reception module 2A of the communication device DCOM2 to the transmission/reception module 1F of the communication device DCOM1 via the communication channel set up between the two communication modules.

Referring to FIG. 4, on reception of the message MESS1 (response yes to the test step E110), the transmission/reception module 2A detects that it is not a response to the request but a request for detail of a parameter of the request transmitted in the framework of the context maintained for the request REQ1 (MESS branch in FIG. 4). The message MESS1 in fact contains, as mentioned previously, the identifier ID(REQ1) of the context CNTX(REQ1) maintained for the request REQ1.

The distinction between a request for detail of a parameter and a response to the request can be established in different ways. An indication provided explicitly for this purpose in the message MESS1 (via notably an appropriate parameter included in the message) can for example make it possible to distinguish the two types of messages (request for detail or definitive response). As a variant, the definitive response or detail request character can be indicated in natural language: for example, for a response, the message formulated in natural language can be "Here is the response: xyz"; on the contrary, for a detail request, the message formulated in natural language can be "I have a question: abcd?". In this variant, to establish the distinction between the two types of messages, the transmission/reception module 2A can search in the content of the message MESS1 formulated in natural language for the predefined keywords such as, for example, "response" or "question" or the presence of a question mark.

The message MESS1 is transmitted to the management module 1C of the module A1 of the communication device DCOM1 which identifies, in the context CNTX(REQ1) maintained for the request REQ1, the value Celsius for the unit requested which had been previously stored in the translation of the request REQ1 into natural language. The module A1 can thus supply, without invoking the connected object O1 and notably its generation module G1 or its processing module U1, the value of the requested parameter. It generates a response message REP_MESS1 containing the value "Celsius" and formulated in natural language (for example quite simply "Celsius"), and transmits it through the transmission/reception module 1F to the communication device DCOM2 to its module A2 (step E120). The response message REP_MESS1 contains the context identifier ID(REQ1) of the request REQ1.

Referring to FIG. 5, the message REP_MESS1 is received by the transmission/reception module 2A of the communication device DCOM2 and transmitted to the module A2 (step F50). The latter extracts the value of the parameter requested in natural language, and specifies (after translation of the value of the parameter) the request REQ1(M2) formulated in computer language M2 (step F60). The latter becomes:

REQ1(M2)="get_temperature (Celsius)"

Other exchanges between the modules A1 and A2 can be implemented if other parameters, notably of the request, have to be specified until it is possible to fully qualify the request formulated by the object O1 for it to be able to be executed and/or processed by the object O2. A record (log) of these exchanges can be maintained by each of the modules to keep a trace of past interactions between the modules A1 and A2.

In a variant embodiment, the module A1 can retain in memory of this interaction with the module A2 that the request REQ1 formulated in the computer language M1 must be translated into the natural language NAT1 by incorporating the value of the temperature measurement unit, and in a subsequent similar request, specify this unit in the translation REQ1(NAT1) formulated in the natural language NAT1.

In another variant embodiment, information other than parameters aiming to specify the request REQ1 can be exchanged through messages between the modules A1 and A2 in the context of the request REQ1: this can be, for example, information representative of the state of the communication devices DCOM1 and DCOM2 and/or of the connected objects O1 and O2, indications on the more or less urgent character of the request, or even elements allowing an authentication between the modules A1 and A2, etc.

The request REQ1(M2) formulated in the computer language M2 is then transmitted by the transmission/reception module 2C of the module A2 to the processing unit U2 of the connected object O2 (step F70).

The request REQ1(M2) is then processed by the processing unit U2 (step F80). In this particular case, the connected object O2 measures the ambient temperature in degrees Celsius (it is assumed that it is in the same room as the connected object O1).

Then, it transmits to the transmission/reception module 2C of the module A2 the temperature measured in degrees Celsius in a response message to the request REQ1 formulated in the computer language M2 (step F90). This response message is designated REP_REQ1(M2).

The response message REP_REQ1(M2) being formulated in the computer language M2, it is translated by the translation module 2B into the natural language NAT2, in other words, in the scenario considered here, into the natural language NAT1 (step F100). To this end, the translation module 1B uses the look-up table that is the reverse of that used during the step F30 of translation of the request REQ1.

The response message REP_REQ1 translated and formulated in the natural language NAT1 is denoted REP_REQ1 (NAT1). In the example considered hereinabove, this response message translated into French (natural language NAT1) can be, by way of illustration, "la température est de 20° Celsius" ("the temperature is 20° Celsius").

The response REP_REQ1(NAT1) translated into natural language NAT1 is then supplied to the module C2 of the communication device DCOM2 and more particularly to its transmission/reception module 2A. The latter transmits the response REP_REQ1(NAT1) to the communication device DCOM1 and more particularly to its module C1 by using the communication channel previously set up (step F110).

Referring to FIG. 4, on reception of this response (response yes to the step E110), the transmission/reception module 1F identifies that it is the response to the request REQ1 (REP branch in FIG. 4) and transmits it to the translation module 1B of the module A1 of the communication device DCOM1. The translation module 1B translates the response REP_REQ1(NAT1) into the computer language M1 used by the connected object O1 and notably by its processing unit U1 (step E130). To this end, it uses the look-up table that is the reverse of that used in the translation step E30.

Then, the transmission/reception module 1A supplies the translated response REP_REQ1(M1) formulated in the computer language M1 to the processing unit U1 of the connected object O1 for this response to be processed (step E140). In the example considered here, the processing unit U1 uses the response supplied by the temperature sensor O2 to regulate the temperature of the room up or down, by acting for example on the room heating.

In the first scenario which has just been described, the communication devices associated with the connected objects O1 and O2 use the same natural language, i.e. NAT1=NAT2, and the identification module 1E is able to identify a communication device DCOM2 of a connected object capable of processing the request from the object O1.

It may be, however, that, in the identification step E60, the identification module 1E does not manage to identify in the database DB1 a communication device of a connected object capable of processing the request REQ1, typically because none of the keywords K1 extracted from the request REQ1 is present in the database DB1. There are several possible reasons for that: for example, the database DB1 is not sufficiently complete and does not contain connected objects able to process the request formulated by the connected object O1, or there is no connected object using the same natural language NAT1 as the communication device DCOM1, etc.

In such a scenario, the identification module 1E is configured to transmit the request REQ1(NAT1) translated into natural language NAT1 to a third-party device 8 (see step E70 briefly described previously). The setting up of the communication by the transmission/reception module 1F of the communication device DCOM1 with this third-party device 8 can be done in the same way as described previously with the communication device DCOM2.

Figure 6:
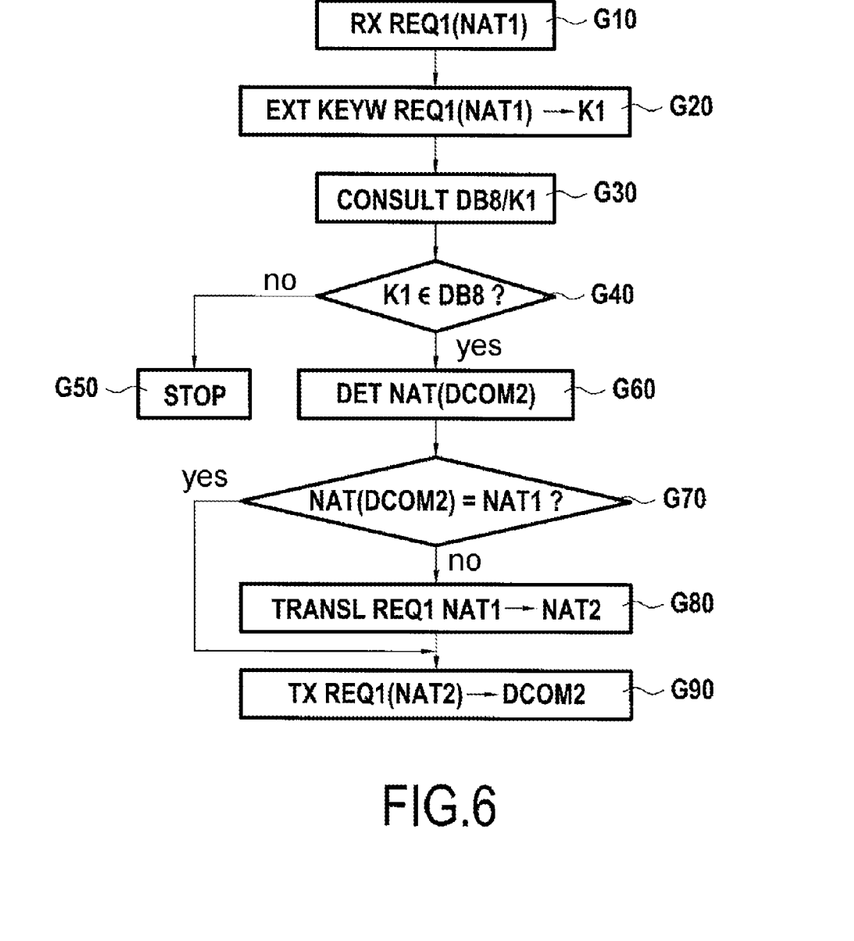
FIG. 6 illustrates the steps implemented by a device of the system of FIG. 1 intervening between two connected objects of this system.

FIG. 6 illustrates the main steps implemented by the third-party device 8 on reception of this request REQ1 (NAT1) (step G10).

It is assumed here, as described hereinabove, that the third-party device 8 has a database DB8 that is more comprehensive than the database DB1 of the communication device DCOM1. This base combines the same type of information as the database DB1 except that it can include communication devices communicating according to a natural language different from the natural language NAT1. It can also comprise communication devices associated with more connected objects than the database DB1, for example because it is a database established by specialist field and not informed only by the user of the connected object O1 according to his or her local knowledge of the system 1.

As an example, it is assumed here that the database DB8 contains notably, linked to the keyword "temperature" formulated in the natural language NAT1, the communication device DCOM2 associated with a connected object O2, but that the latter now uses a natural language NAT2 distinct from the natural language NAT1. For example, NAT2 is English and NAT1 is French. The natural language NAT2 used by the communication device DCOM2 is associated in the database DB8 with the entry corresponding to the keyword in natural language NAT1 "température".

On reception of the request REQ1(NAT1) formulated in natural language NAT1, the third-party device 8, via its identification module 8A, determines the natural language NAT1 used by the request, and extracts keywords K1 representative of this request. To this end, it proceeds in a way similar to what has been described previously for the identification module 1E of the communication device DCOM1 (step G20).

Then the identification module 8A of the third-party device 8 interrogates, using the keyword or keywords K1 in natural language NAT1, the database DB8 (step G30). The database DB8 may have, to facilitate this interrogation, keywords classified by natural language.

If the keyword or keywords K1 are not present in the database DB8 (response no to the test step G40), then the third-party device 8 responds negatively to the request REQ1 and transmits this negative response to the communication device DCOM1 (step G50). The system 1 is not able to identify a connected object that makes it possible to respond to the request from the connected object O1 and the latter is prompted to formulate another request.

As a variant, the third-party device 8 can be configured to interrogate another database, even more comprehensive than the database DB8.

If the keyword or keywords K1 are present in the base DB8 and linked in this base to a communication device associated with a connected object (response yes to the test step G40), the identification module 8A determines, from information stored in the base DB8, the natural language used by this communication device (step G60). In the example of the database DB8 described previously, the keyword K1="température" in natural language NAT1 (French) is linked to the communication device DCOM2 of the connected object O2 which uses the natural language NAT2 (English).

The identification module 8A compares the two natural languages NAT1 and NAT2 (test step G70).

Since the natural language NAT2 is different from the natural language NAT1 (response no to the test step G70), the third-party device 8, via its translation module 8A, then translates the request REQ1(NAT1) formulated in the natural language NAT1 into the natural language NAT2 (step G80). To this end, it uses a conventional dictionary base from the natural language NAT1 to the natural language NAT2.

If the two languages are identical, no translation is implemented.

Then, a communication channel is set up between the third-party device 8 and the communication device DCOM2 of the connected object O2, and the request REQ1(NAT2) formulated in the natural language NAT2 used by the communication device DCOM2 is sent via this communication channel to the communication device DCOM2 (step G90).

The communication device DCOM2, on reception of this request REQ1(NAT2) formulated in the natural language NAT2, proceeds in a way similar to what has been described previously in the first scenario with reference to FIG. 5, by using the natural language NAT2 distinct from the natural language NAT1. It should be noted that, in this second scenario, the third-party device 8 is a flow cutout for all the exchanges in natural language implemented between the two communication devices DCOM1 and DCOM2 to perform the translation of these exchanges from the natural language NAT1 to the natural language NAT2 and vice versa.

It should be noted that, in the two scenarios considered, the two connected objects communicate by using a computer language which is specific to them. It is however possible to consider applying the invention in a context where one or other of the transmitting and receiving entities uses a natural language and not a computer language, in which case, the preliminary step of translation of the request or of the response from a computer language to a natural language is not necessary.

The invention claimed is:

1. A communication device associated with a transmitting entity, the communication device comprising:
   a processor; and
   a non-transitory computer-readable medium comprising instructions stored thereon which when executed by the processor configure the communication device to perform acts comprising:
   receiving with a first transmission/reception module, from the transmitting entity, a request formulated in a formal language or a predetermined natural language;
   translating the request into the predetermined natural language in response to said request being formulated in the formal language;
   extracting, from the request translated into the predetermined natural language or formulated in the predetermined natural language, at least one keyword representative of the request;
   identifying from target devices known by the communication device, by using said at least one extracted keyword, a target device supporting the predetermined natural language to which to transmit the request; and
   transmitting with a second transmission/reception module the request formulated in the natural language to the target device.

2. The communication device as claimed in claim 1, in which the communication device is further configured to:
   activate the first transmission/reception module on reception of a response formulated in the natural language to the request, to transmit this response to the transmitting entity; and translate the response prior to its transmission to the transmitting entity into the formal language in response to the transmitting entity communicating by using the formal language.

3. The communication device as claimed in claim 1, in which the communication device is further configured to:
interrogate, by using said at least one extracted keyword, a database comprising at least one keyword belonging to the predetermined natural language, linked to at least one communication device supporting the predetermined natural language and associated with a communicating object capable of processing the request of which said at least one keyword is representative.

4. The communication device as claimed in claim 3, in which the communication device is further configured to identify as the target device:
a communication device associated with a communicating object capable of processing the request and linked in the database to said at least one extracted keyword; or
a predefined device if the database does not contain said at least one extracted keyword.

5. The communication device as claimed in claim 4, in which the predefined device is a device capable of identifying a communicating object capable of processing the request of which said at least one extracted keyword is representative.

6. The communication device as claimed in claim 3, in which the communication device is further configured to:
obtain capabilities of at least one communicating object; and
add to the database a communication device supporting the predetermined natural language and associated with the communicating object by linking it to at least one keyword determined on the basis of the capabilities obtained from the communicating object.

7. The communication device as claimed in claim 3, in which, in the database, at least one keyword representative of a request is also linked to a parameter that makes it possible to specify said request.

8. The communication device as claimed in claim 1, further comprising using the second transmission/reception module to set up, with the target device, a communication channel of instant messaging type to communicate with this target device by using the predetermined natural language.

9. The communication device as claimed in claim 1, wherein the communication device is further configured to maintain a context for the request over a determined period, the context maintained by a management module comprising a context identifier associated with the request.

10. The communication device as claimed in claim 9, wherein the communication device is further configured to supply, without invoking the transmitting entity, at least one parameter to the target device specifying the request in a message comprising the context identifier associated with the request.

11. A communication device associated with a communicating object, the communication device comprising:
a processor; and
a non-transitory computer-readable medium comprising instructions stored thereon which when executed by the processor configure the communication device to perform acts comprising:
identifying said communication object by the communication device from target devices known by the communication device;
receiving with a first transmission/reception module, from an origin device, a request that the communicating object is capable of processing, said request being formulated in a predetermined natural language;
translating with a translation module the received request formulated in the predetermined natural language into a request formulated in a formal language used to communicate by the communicating object; and
transmitting with a second transmission/reception module, the request formulated in the formal language to the communicating object.

12. A communication method implemented by a communication device associated with a transmitting entity, said method comprising:
receiving a request transmitted by the transmitting entity and formulated in a formal or a predetermined natural language;
translating the request into the predetermined natural language in response to said request being formulated in the formal language;
extracting, from the request translated into the predetermined natural language or formulated in the predetermined natural language at least one keyword representative of the request;
identifying from target devices known by the communication device, by using said at least one extracted keyword, a so-called target device supporting the predetermined natural language to which to transmit the request; and
transmitting the request to the identified target device.

13. A communication method implemented by a communication device associated with a communicating object, wherein the communication method comprises:
identifying said communication object by the communication device from target devices known by the communication device;
receiving, from an origin device, a request that the communicating object is capable of processing, said received request being formulated in a predetermined natural language;
translating the received request formulated in the predetermined natural language into a request formulated in a formal language used by the communicating object to communicate; and
transmitting the request formulated in the formal language to the communicating object.

14. The communication method as claimed in claim 13, also comprising:
receiving, from the communicating object, a response to the request, said response being formulated in the formal language;
translating the response formulated in the formal language into a response formulated into the predetermined natural language; and
transmitting to the origin device of the response formulated in the predetermined natural language.

* * * * *